Oct. 24, 1950 — A. GOETZ — 2,526,656
FILTER PUMP

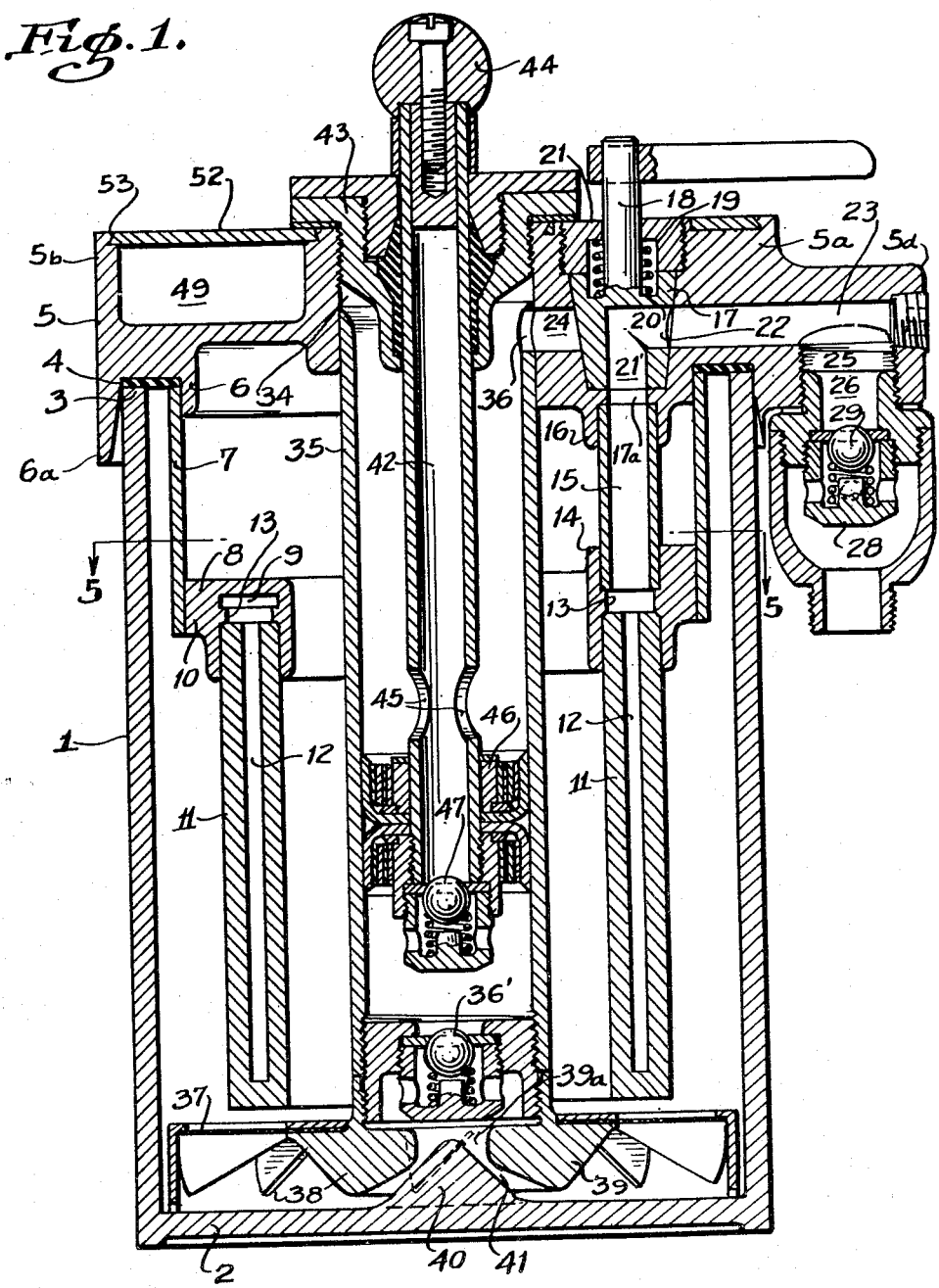

Filed Nov. 29, 1946 — 3 Sheets-Sheet 2

INVENTOR
Alexander Goetz
BY
ATTORNEY

Oct. 24, 1950     A. GOETZ     2,526,656
FILTER PUMP

Filed Nov. 29, 1946     3 Sheets-Sheet 3

INVENTOR
Alexander Goetz
BY
ATTORNEY

Patented Oct. 24, 1950

2,526,656

UNITED STATES PATENT OFFICE 2,526,656

FILTER PUMP

Alexander Goetz, Altadena, Calif., assignor to Sunshine Mining Company, Yakima, Wash., a corporation of Washington Application November 29, 1946, Serial No. 713,048

6 Claims. (Cl. 210—152)

This invention relates to a pump and filter combination useful for the filtration of various fluids. It is particularly useful for the sanitation of infested water by filtration through a bactericidal agent.

It is an object of my invention to devise a filter and pump combination which will permit of a simple and efficient construction useful for the filtration of water to remove or destroy bacteria, spores, phage, virus, etc.

It is a further object of my invention to provide for a filter and filter pump assembly which will simultaneously pump and filter fluids for such and other purposes.

It is a further object of my invention to provide for the use of a filter and filter pump construction employing a multi-faced filter element whereby the material pumped is filtered through the various faces of the filter element under a balanced pressure whereby the filter rate at the various faces is balanced by balancing the fluid pressure at the various faces.

It is a further object of my invention to construct such filter and pump combination to be inserted into the container into which the fluid is pumped and to compress the air in said container and to discharge the fluid through said filter under the pressure of said compressed air.

It is a further object of my invention to maintain a uniform pressure in my filter pump chamber substantially independent of the fluctuation of the pump pressure.

It is a further object of my invention to provide for the precoating of the filter element by circulation of fluid in the pump container through the filter element and back into the inlet of said pump.

It is a further object of my invention to increase the fluid pressure on the upstream side of the filter element near the termination of the pre-coat cycle by increasing the fluid pressure in the cylinder at such portion of the cycle.

It is a further object of my invention to cause a shock pressure to be applied to the precoated filter at the termination of the pre-coat cycle in order to anchor the precoat on said filter.

It is a further object of my invention to employ a pressure on the upstream side of the filter during the precoating operation or at the termination thereof which is greater or at least not substantially less than the filtrate back pressure during the filtration of the fluid through the filter tank.

It is a further object of my invention to provide for a filter pump combination wherein back flow of fluid across the filter is prevented to insure against sloughing off of the filter case.

It is a further object of my invention to devise a filter and filter pump combination in which the cross connection between the outlet and the inlet is avoided so that at all times no accidental flow of contaminated water from the inlet of the unit may get into the outlet.

It is a further object of my invention to prevent this cross connection and possible flow of polluted incoming water into the outlet by maintaining the outlet pressure on the filtrate at all times during filtration higher than the pressure of the incoming polluted water.

It is a further object of my invention to devise a filter pump and filter combination whereby a powder material may be introduced into a container in which the filter and pump are inserted, and means are provided to cause a dispersion of the powder so that it may be deposited by circulation of the fluid upon the filter element to precoat the same.

These and further objects of my invention will be better understood by reference to the accompanying description when taken together with the drawings, in which Fig. 1 is a vertical section of the filter and pump combination taken along the line 1—1 of Fig. 3;

Figure 3:
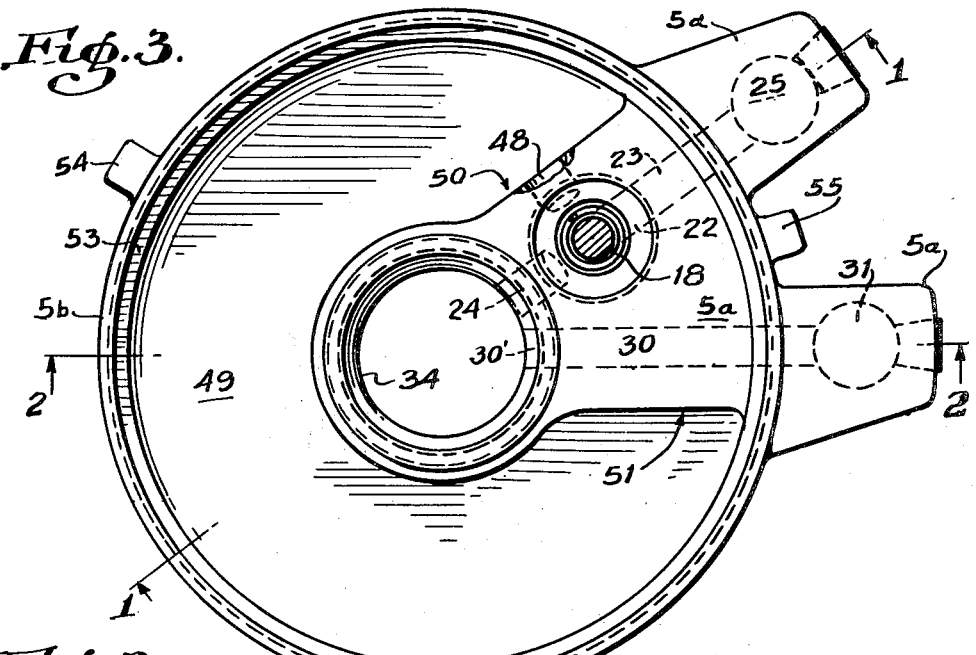
Fig. 3 is a top view of the pump with the cover removed and with the piston rod and piston and the stuffing box and stuffing gland removed for clear showing.
Figure 2:
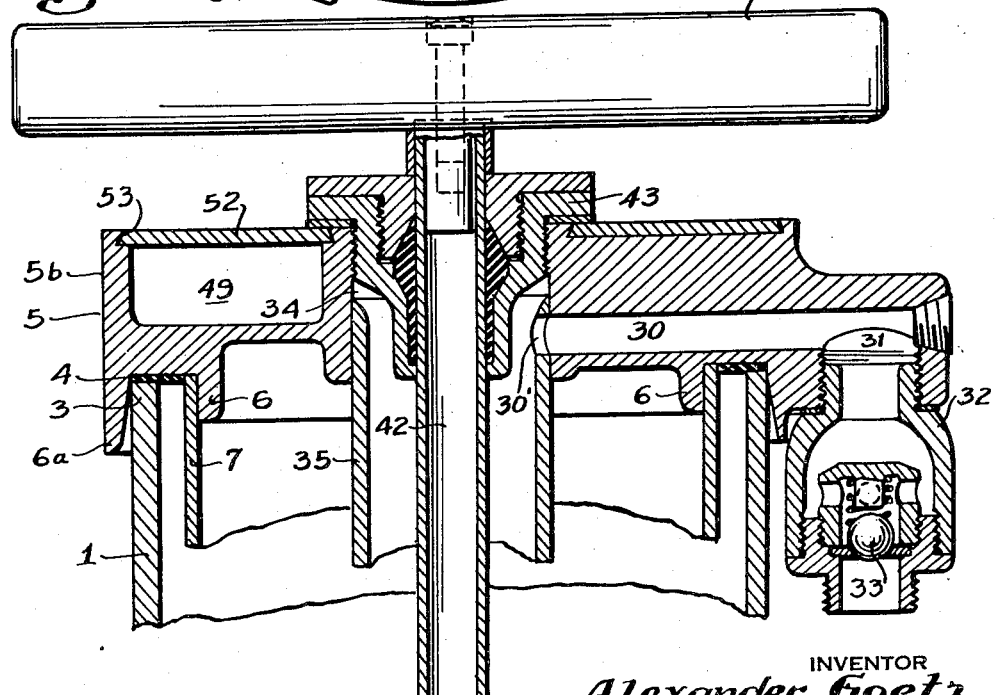
Fig. 2 is a fragmentary section of the top portion of the filter and filter pump combination taken along the line 2—2 of Fig. 3.

The cylindrical container 1 having a bottom 2 and an end 3 carries a head 5 positioned on the end 3 and suitably packed with a gasket 4. The head 5 is formed with a rim 5d and carries a boss 5a. The shape of the boss 5a is shown in Fig. 3. The head 5 is formed with a depending internal flange 6 which together with the external flange 6a forms an annulus into which the gasket 4 is set. A ring 7 is held on the flange 6 by means of a press fit and this ring carries a filter ring 8 attached thereto also by a press fit or any other suitable means of attachment.

The ring 8 is formed with depending flanges 10 which form an annular recess 9. The flanges 10 are formed with abutments 13 against which the cylindrical filter 11 is pressed upon insertion of the cylinder 11 into the annular recess 9. The edges of the cylinder at the top where they abut against the abutment 10 are coated with rubber or some other suitable pressure sensitive adhesive material suitable for attaching the cylinder to the abutment and to seal the joint thus formed to prevent water leakage.

Figure 5:
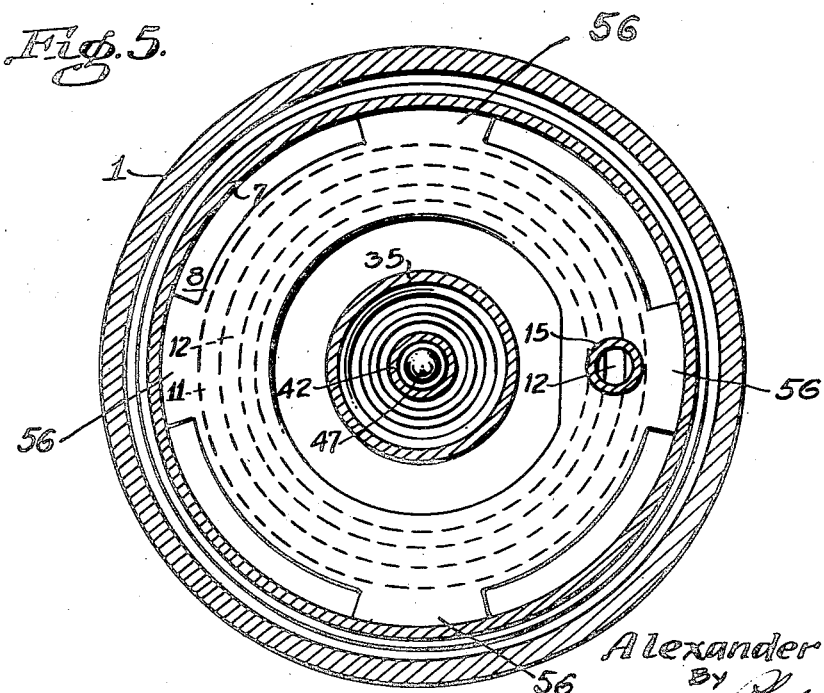
Fig. 5 is a section taken of Fig. 1 along the line 5—5 of Fig. 1.

The ring 8 is also formed at one end thereof with a boss 14, more clearly shown in Fig. 5. The boss is bored with a vertical bore to register with the annulus chamber 9 and to permit the insertion thereinto of a tube 15 which is also inserted into a bore in the boss 16 on the underneath side of the head 5. The boss 16 also carries a bore 17a coaxial with the bore in 16 and which, being of smaller diameter, forms a shoulder for the tube 15.

The boss 5a is bored with a conical bore adapted to receive a conical plug valve 17. The plug valve carries a stem 18 which, together with the body of the valve, forms an annular recess 19 into which is set a spring 20 held by a cap 21. The plug valve 17 carries a vertical bore 21' coaxial with the bore of the tube 15 and a cross bore 22 communicating with the bore 21'. The boss 5a is bored with a bore 23 and 24 coaxial with the bore 22 of the plug valve 17 and with a cross bore 25. Into the bore 25 is screwed or otherwise introduced an outlet fitting 26 carrying a valve cage 28 and a spring loaded ball check valve 29.

An additional bore 30 is bored in the boss 5a. The center line of the bore 30 is at an angle to the bore of 23. A cross bore 31 is also bored in 5a to intercept the bore 30 and into this bore 31 is screwed an inlet fitting 32 carrying a ball check valve 33.

Figure 4:
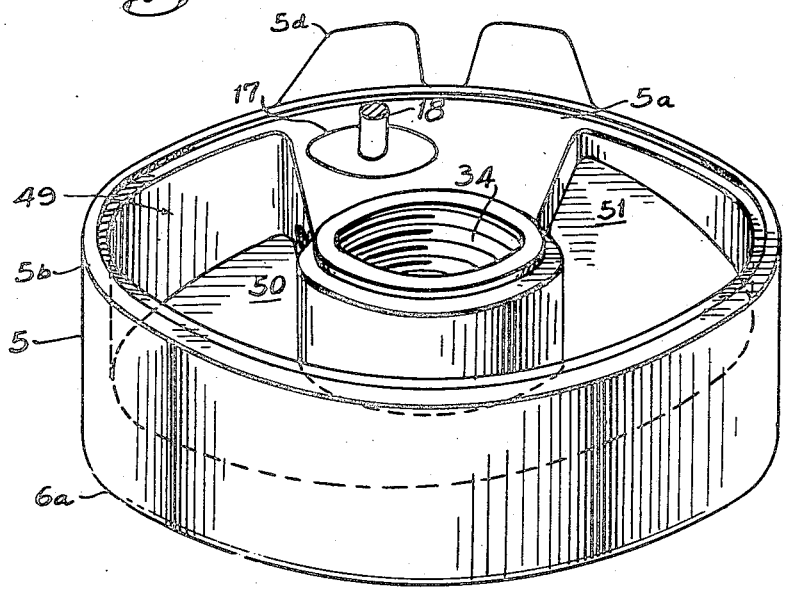
Fig. 4 is an isometric view of the top of the unit shown in plan view in Fig. 3.

A vertical bore 34 is formed, with center on the center line of the chamber 1, in the boss 5a and into this bore is inserted a cylinder 35 held in said bore by means of a press fit or some other suitable means of attachment. A bore 36 is formed in the cylinder to be in registry with the bore 24 and a bore 30' is bored in the cylinder in registry with the bore 30. Attached to the lower end of the cylinder 35 is a spring loaded foot valve 36' and a screen 37 on the underneath side of which is set a plurality of vanes 38 circularly disposed around the outer underneath surface of the screen. The plane of the blades 38 is set at an angle to the underneath surface of 37, as illustrated in Figs. 1 and 4.

Positioned on the underneath side of the screen 37 and concentric therewith is an annular ring 39. Centrally disposed on the bottom 2 is a cone 40 the slope of which is such that an annular venturi 41 is formed between the sloping inner end of the annular ring 39 and the surface of the cone 40, thus providing an opening 39a which communicates with the annular venturi 41.

The tubular piston rod 42 is slidably positioned in a stuffing box and packing gland 43. The piston rod may be reciprocated by the handle 44. Ports 45 are provided in the tube 42. Mounted upon the tube 42 is a piston 46 and a spring loaded travelling valve 47.

In the boss 5a is also positioned a cross bore 48 positioned at 90° to the bore 23 and in registry with the bore 21 when the valve is rotated counterclockwise 90° from the position shown in Fig. 1 communicating with the chamber 49 formed by the rim 5b of the head 5. The chamber 49 has a spiral bottom spiralling upwardly from a low point at 50 to a high point at 51. A cover 52 is positioned in grooves 53 to entirely close the chamber 49, as shown in Figs. 1 and 3.

To unassemble the unit, the packing gland 43 and stuffing box may be unscrewed from the head 5 and the piston and piston rod withdrawn. The valve 47 may be unscrewed. The head 5 may be detached from its seat by removing the clamps which hold the head down on the chamber 1 by means of lugs 54 and 55 in cooperation with suitably disposed lugs upon the chamber 1.

The cylinder 35, filter element 12 may thus be withdrawn along with the head 5. The valve 36 and disperser stem 37 may be unscrewed from the cylinder. The filter element 12 may then be removed from its seat in chamber 9 and the head 55 may be sprung out of its position in the grooves 53. Valve 17 may be removed by unscrewing the cap 21. It is thus possible to clean all parts of the pump and cylinder attachment and to introduce a new filter element. The reassembly will be evident from what has been said before, and note may be taken that the packing gland and stuffing box 43 will act to hold down the cover 52 which it overlaps.

The operation of the device is as follows:

Before assembling the unit a suitable amount of filter powder is introduced into the bottom of the container 1 and the filter pump is then assembled. The cock 17 is rotated 180° from the position shown in Fig. 1 so that the bore 22 is in communication with the bore 24. Bore 23 and bore 48 are thus closed off against the blank face of the cock. Communication is thus established from the cylinder 35 through the valve 36, through the opening 39a, through annular venturi 41, through the filter channels 12 of filter 11, through the annular chamber 9, tube 15, cock 17, and bore 24 back to the cylinder 35.

The inlet 32 having been suitably connected to a source of water or other fluid to be treated, piston 46 is reciprocated by pumping the piston rod 42 up and down by means of handle 44. On the downstroke of the piston fluid flows through inlet 32, lifting the check valve 33 through bores 30 and 30' into the cylinder 35 above the piston 46. On the upstroke of the piston the pressure generated in the cylinder 35 above the piston 46 closes the check valve 33 and opens the spring loaded valve 47. The fluid in 35 then flows through the ports 45 into the tubular piston rod 42 and through the valve 47, which opens under the pressure when it is sufficient to overcome the spring, into the cylinder 35 below the piston rod piston into cylinder 35. On the next descending stroke of the piston cylinder the pressure generated in the cylinder 35 below the piston 46 closes the valve 47 and opens the valve 36 against the load of the spring. During such descent of the piston fluid enters the cylinder 35 above the piston 46, as has been described previously.

The water as it passes under pump pressure through the opening 39 exits through the venturi 41 in the form of an annular jet, thus causing a dispersion of the powder which has been placed in the bottom 2. The vanes 38 impart a rotary motion to the stream creating a vortex-like motion and the fluid enters through the screen 37 into the upper portion of the cylinder 1. It will be observed that by means of a screen of suitable mesh only the finely dispersed particles will pass upward, the undispersed material remaining behind. As the water rises in chamber 1, the air in chamber 1 is compressed against the head 5, there being no outlet from this chamber except through the filter 11. When sufficient fluid has collected in chamber 1 to compress the air into chamber 1 to a sufficient pressure to overcome the flow resistance of the filter and other passageways, filtration starts. Channels 11, annular chamber 9, tube 17, and bores 21 and 24 fill with filtered water or other fluid being treated which then passes into 35. Circulation is continued by this pumping action.

It will be observed that until the water in the chamber 1 reaches some level above the top of the annular ring 8 the filtration and circulation of water through tube 15 and bores 21 and 24 will not occur because of the back pressure of the filter element. The filtration begins when the water level rises sufficiently above the top of the ring 8 so that air pressure generated in the chamber 1 is sufficient to overcome the flow resistance and to raise the column of water in the tube 15 sufficiently to flow through the ports 24 and 36.

It will thus be seen that during the filtration operation both sides of the cylinder 11 are in communication with each other underneath the cylinder 11 and through the port formed between the bosses 56 positioned on the exterior wall of the ring 8, see Fig. 5. Pressure is thus equalized on both sides of the cylinder 11 and flow of fluid is therefore uniformly caused through both faces of the filter cylinder. As circulation is continued more and more material is dispersed and deposited as a precoat on both sides of the filter element 11.

It will be observed that during the initial period of the precoat operation while the fluid in chamber 1 is insufficient to cause overflow of filtrate through the port 24, the fluid entering the cylinder 35 is the fluid flowing through the inlet 30. As communication and flow are established and fluid enters through 24, a larger and larger percentage of the circulating fluid is material which has been filtered and contacted with the filter powder. However, as precoat builds up and differential pressure increases the rate of flow through the filter and into the port 24 becomes less and less, and since pressure in 35 thus drops, fluid will enter through valve 43 and the pressure in chamber 1 is maintained. In this manner the pressure on the upstream side of the cake, that is, in the chamber 1, becomes greater as the filtration continues, thus anchoring the filter cake more and more firmly as the precoating operation proceeds.

It will be observed that the inflow of water into the cylinder 35 from the inlet occurs only when the pressure in the cylinder 35 is less than the inlet pressure by reason of the descent of the piston. If, however, the hydraulic pressure in 24 communicated thereto by means of the compressed air in the buffer column, as previously discussed, is greater than this inlet pressure the pressure in 35 may actually be maintained, during the descent of the pump, at a pressure higher than the pressure in the upstream side of the inlet valve 33, in which case no inlet fluid enters and the circulated material is entirely the material which has been filtered and treated as described above. It will be observed that the procedure not only precoats the filter 11 but also circulates sterile water throughout the system and retreats this water to cause a sterilization of the interior of the whole apparatus.

The apparatus now being full of purified water and a precoat having been formed, the cock 17 is turned to the position shown in Fig. 1 to connect the bore 22 with the bore 23 of the outlet port 25. It will thus be seen that bore 23 is thus suddenly exposed to the outlet pressure which may be atmospheric. The high air pressure in the buffer volume, as described above, inside the chamber 1 is thus suddenly expanded and released through the channels 12, chamber 9, tube 15, and bore 23. A sudden rush of water is thus occasioned through these conduits and the shock pressure due to the dynamic head of this high velocity stream anchors the precoat onto the filter element 11. Since this shock pressure, together with the hydraulic pressure, is greater than any pressure which will be exerted on the filter cake, and particularly greater than any back pressure which may be generated, during the operation of the unit on the interior of the channel 12, the filter cake is thus anchored with a pressure which exceeds any back pressure which might tend to slough off the filter cake. In normal operation the pressure on the interior of channel 12 will be merely the back pressure of the flow in channel 17 and 23 and the spring load on the valve 29.

Normal filtration may now proceed by reciprocation of the pump cylinder, the fluid entering from 32, 31, and 30 into the cylinder 35 above the piston 46 on the downstroke of the piston and discharging through port 45 and valve 47 on the upstroke of the piston and discharging into the underneath side of the piston. Then on the subsequent downstroke the fluid discharges through valve 36 through the annular venturi 41 to be given a swirling rotary motion by the vanes 37. It passes upwardly into the chamber in a tangential swirling motion against the filter cake on filter 11 to be discharged into the channel 12, and thence into the chamber 9, tube 15, ports 21, 23, and then to discharge through the valve 29 into the outlet.

It will be observed that because of the swirling motion any undeposited filter material will be suspended and deposited on the filter cake. The flow of filtrate through the filter cake will not be radial but at some angle to the radius, thus increasing the path of flow through the filter cake and thus increasing the time of contact of fluid with the powder which acts to sanitize the water.

Because of the existence of the ports in the chamber 8 the flow, as in the case of the precoat, is uniform over the whole surface of the cylinder with a uniform pressure against all surface elements thereof. The flow is steady as a result of the buffer volume in chamber 1, independently of fluctuations of the pump pressure resulting from the reciprocation of the pump 50.

As will be observed from Fig. 1, when the cock is in the position shown in that figure, i. e., connected to discharge, the discharge of fluid through the valve 29 is only possible when the pressure in outlet 25 is at least sufficient to overcome the spring loading of the valve 29 on its seat. Usually for purposes of water sanitation this may be about 2 to 5 pounds. Thus, the outlet pressure of the fluid is at all times above atmospheric or the pressure in the reservoir connected to the outlet fitting 26 by the amount determined by the spring loading of valve 29. Flow is therefore only occasioned when the air pressure in the container 1 is at least sufficient to overcome the reservoir pressure plus this spring loading and plus the back pressure of the filter and conduits.

After the precoat has been formed and the valve has been moved to the outlet position that amount of pressure is present and results in the initial high velocity stream and then settles down to the normal flow resulting from the action of the pump. The oscillating flow resulting from the reciprocation of the pump is, however, smoothed out by the buffering action of the air cushioning. Water is thus discharged in a steady stream through the outlet 26 independently of the reciprocation of the pump.

The spring loading of valve 29 also has the additional function of assuring that the pressure in port 23 is always superatmospheric and higher than the pressure in the bore 30, that is, above the pressure of the inlet. Thus, since the space in cylinder 35 above the piston on the downstroke side of the piston cycle is below the inlet pressure of the fluid entering into bore 30 from 32 and on the upstroke of the piston the pressure in 35 above the piston cannot exceed the pressure at the inlet because of the communication established via ports 46 and valve 47 with the underneath side of the piston during the upstroke. Even though the cylinder 35 above the piston is full of water, the water is therefore in port 24 under the inlet pressure, the pressure in port 23 will always be greater than the pressure in port 24 at least by the amount of the spring loading. Any leak which may occur occurs from the sterile water in port 23 into the port 24 rather than a leak of the unpurified water from port 24 into the outlet port 23.

This precaution is of the utmost importance since otherwise any cross connection between the inlet and outlet would result in intrusion of contaminated water into the outlet. The provision here made to prevent this cross connection and to insure that any leak which may occur occurs from the sterilized water which is under relatively higher pressure into the unsterilized water which is at a relatively lower pressure assures that only pure water is discharged from the pump.

The valve 29 also has the function of preventing development of any back pressure in the channels 12 resulting from any sudden elevation of the pressure in the discharge outlet 26. Thus, should the discharge outlet 26 be connected by a hose to any container and if, accidentally, that container is elevated to a high point so that a hydrostatic head is developed in chamber 26, and if this hydrostatic head were allowed to flow backwards, assuming it to be greater than the pressure in the container 1, the cake on 11 may be disturbed and the efficiency of the filtration destroyed. The provision of the check valve 29 thus insures that if at any time the pressure at 26 becomes equal to or greater than passageway 25, which is, of course, lower than in 1, check valve 29 will close and it will close even at lower pressure in 26 as result of the spring pressure. Thus, the back flow of fluid into the channels 12 from the outlet 26 is prevented and the integrity of the cake is protected.

As will be recognized, where fluid is being treated which contains suspended matter, as, for example, the suspended matter present in the fluid entering through the inlet, or the suspended matter introduced into the fluid by means of the powder which is employed in filtration, this may cause the valves to leak. The duplication of valves provided for in this construction also aids in the protection of the cake to prevent its sloughing.

It will be seen that valves 36 and 33 are essentially duplicative in function on the upstroke of the piston, and the pump will function with either valve 47 or 33 omitted. However, should valve 36 leak with no valve 33 provided, or vice versa, then on the upstroke of the piston fluid will be drawn through valve 36 from the chamber 1 into the outlet, thus reducing the pressure in chamber 1. The pressure in 23 would thus be higher than in chamber 1 and the cake may slough off. By providing two valves in series, any leak on one or both of the valves 47 or 33 will prevent any material drop in pressure in chamber 41, since even if both valves are leaking, the flow permitted by such two valves in series would be insubstantial and they will act as effectively as one tight valve to prevent the fall in pressure in chamber 1.

The foot valve 36 has an additional important function in preventing the sloughing off of the cake where gases are present in the fluid being filtered. Assume that the cylinder 1 has stood for a sufficient length of time so that the buffering of air pressure has exhausted through the outlet port. Assume that the piston is in the downstroke position. Assume also that the cylinder above the piston is filled with water containing the dissolved gases or that a bubble of air is present in the cylinder above the piston. In such situation, which may not be uncommon, on the upstroke, the gas being compressible, the pressure in the cylinder below the piston may actually be less than the pressure in cylinder 1. This results in the movement of water from the container 1 into the bottom of the cylinder beneath the piston. This would produce a reduction in pressure in the container 1 which may be sufficient to slough off the cake. The provision of the foot valve 36 prevents this back flow and prevents the reduction of pressure in the container 1 and maintains the integrity of the cake.

At the termination of the filtration operation it becomes important to remove the filter cake completely from the filter element 11 in order to prepare the filter element for a new operation. To accomplish this result plug valve 17 is rotated until the bore 22 is in registry with the bore 48. It will be observed that the bore 48 is positioned in the floor of the chamber 49. Pumping is continued, as previously, but the filtrate is now directed into the port 48 instead of through the port 23. The ports 23 and 24 are plugged off against the blank face of the cock. The filtrate collects in chamber 49, travelling from the low point of the spiral floor of the chamber 49, upwardly along the upsweeping spiral floor. As fluid is pumped more and more fluid collects in 49, moving upwardly to the high point 51 compressing the air in 49 as the water front advances. After a few strokes a very high pressure is generated in chamber 49.

Referring to Fig. 3, it will be observed that the clamps positioned at 54 are less than 120° apart and that the angle between the clamps 54 and 55 is in excess of 120°; for example, clamp 54 may be 100° apart and clamp 55 may be 130° from clamp 54. Thus, by releasing clamp 55 the top 5 may be rocked on the clamp 54 without removing the clamp 54 and the seal between the head 5 and chamber 1 is thus broken. This rapid break of the seal immediately drops the pressure in the container 1 to about atmospheric and the high air pressure trapped in 49 blows the water through the port 48 back through the plug valve 21, tube 15, and through channel 12, blowing the cake from the outside wall 11 of the filter.

It will be observed that by this procedure a violent flow of water across the whole surface of the filter cylinder 11 occurs and a complete discharge of the cake which is caused to collect in chamber 1. It will also be observed that the back flow is made entirely with filtered or sanitary water and that when the filter is disassembled and the suspended filter cake in the volume of water collected in 1 is poured out the filter, the unit is wetted with pure water in all its parts. This will prevent pollution of the filter pump when it is stored for any length of time. If polluted water be present, bacterial and fungus growth will occur inside the filter. It is now possible to proceed immediately to a new filter cycle by placing a new charge of powder in the chamber 1 and repeating the operations as described.

While I have described a particular embodiment of my invention for the purpose of illustration, it should be understood that various modifications and adaptations thereof may be made within the spirit of the invention as set forth in the appended claims.

I claim:

1. A filter comprising a pump, a fluid inlet line to said pump, a fluid discharge passageway connected to said pump a chamber, said passageway discharging adjacent the bottom of said chamber, a jet positioned in said chamber at the end of said conduit discharging into said chamber, a screen positioned in said chamber above said jet, a filter element positioned above said screen, a filtrate discharge conduit connected to said filter element, a filtrate outlet connected to said filtrate discharge conduit, a spring loaded discharge valve in said outlet, a by-pass conduit connecting said filtrate discharge conduit to said pump inlet, and a by-pass valve positioned between said spring loaded valve and said pump inlet for selectively connecting said discharge conduit to said outlet and to said by-pass.

2. A filter pump comprising a chamber, an air tight cover for said chamber, a pump cylinder positioned in said chamber, a piston and piston rod reciprocably positioned in said cylinder, a travelling valve in said piston, an inlet to said cylinder above said valve, a discharge outlet from said cylinder to said chamber, a filter element in said chamber, a filtrate discharge conduit connected to said filter, a filtrate discharge outlet connected to said filtrate discharge conduit, a by-pass connected to said discharge conduit and to said cylinder above said piston, a by-pass valve positioned in said by-pass and in said discharge conduit for selectively connecting said discharge conduit to said by-pass and to said outlet.

3. A filter pump comprising a chamber, a removable head for said chamber, means for making an air tight seal between said head and chamber, a second air tight chamber in said head, a pump cylinder mounted on said head and positioned in said chamber, a piston and piston rod reciprocably positioned in said cylinder, a travelling valve in said piston, an inlet to said cylinder, an annular venturi discharge nozzle from said cylinder into said chamber, a screen in said chamber above said discharge venturi, vanes in the bottom of said screen, a cylindrical filter positioned around said pump cylinder, filtrate channels in said cylindrical filter, a discharge conduit from said filter cylinder connected to said channels and discharging outside said chamber, an outlet connected to said discharge conduit, a spring loaded valve in said discharge conduit, a by-pass from said discharge conduit to said pump cylinder, a second by-pass to said second air tight chamber, and a valve in said discharge conduit for selectively connecting said discharge conduit to said chamber and to said second chamber.

4. A filter pump comprising a chamber, an air tight head for said chamber, a removable head for said chamber, means for making an air tight seal between said head and chamber, a second air tight chamber in said head, a pump cylinder mounted on said head and positioned in said chamber, a piston and piston rod reciprocably positioned in said cylinder, a travelling valve in said piston, a foot valve in said cylinder, an inlet to said cylinder, a check valve in said inlet, an annular venturi discharge nozzle from said cylinder into said chamber, a screen in said chamber above said discharge venturi, vanes in the bottom of said screen, a cylindrical filter positioned around said pump cylinder, filtrate channels in said cylinder, a discharge conduit from said filter cylinder connected to said channels and discharging outside said chamber, an outlet connected to said discharge conduit, a spring loaded valve in said outlet, a by-pass from said discharge conduit to said pump cylinder, a second by-pass to said second air tight chamber, and a valve in said discharge conduit for selectively connecting said discharge conduit to said chamber and to said second chamber.

5. A filter pump comprising a chamber, a removable head for said chamber, means for making an air tight seal between said head and chamber, a second air tight chamber in said head, a pump cylinder mounted on said head and positioned in said chamber, a piston and piston rod reciprocably positioned in said cylinder, a travelling valve in said piston, an inlet to said cylinder, a discharge conduit from said cylinder into said chamber, a cylindrical filter positioned around said pump cylinder, filtrate channels in said cylindrical filter, a discharge conduit from said filter cylinder connected to said channels and discharging outside said chamber, an outlet connected to said discharge conduit, a spring loaded valve in said discharge conduit, a by-pass from said discharge conduit to said pump cylinder, a second by-pass to said second air tight chamber, and a valve in said discharge conduit for selectively connecting said discharge conduit to said chamber and to said second chamber.

6. A filter pump comprising a chamber, a removable head for said chamber, means for making an air tight seal between said head chamber, a second air tight chamber in said head, a pump cylinder mounted on said head and positioned in said chamber, a piston and piston rod reciprocably positioned in said cylinder, a travelling valve in said piston, an inlet to said cylinder, a discharge conduit from said cylinder into said chamber, a cylindrical filter positioned around said pump cylinder, filtrate channels in said cylindrical filter, a discharge conduit from said filter cylinder connected to said channels and discharging outside said chamber, an outlet connected to said discharge conduit, a by-pass from said discharge conduit to said pump cylinder, a second by-pass to said second air tight chamber, and a valve in said discharge conduit for selectively connecting said discharge conduit to said chamber and to said second chamber.

ALEXANDER GOETZ.

REFERENCES CITED

The following references are of record in the file of this patent:

UNITED STATES PATENTS

| Number | Name | Date |
|---|---|---|
| 629,387 | Nordtmeyer | July 25, 1899 |
| 677,547 | Kirk | July 2, 1901 |
| 864,810 | Taylor | Sept. 3, 1907 |
| 2,076,935 | Burckhalter | Apr. 13, 1937 |
| 2,108,798 | Dalrymple | Feb. 22, 1938 |
| 2,338,419 | Forrest et al. | Jan. 4, 1944 |
| 2,372,640 | Alder | Apr. 3, 1945 |
| 2,390,539 | Katcher | Dec. 11, 1945 |
| 2,434,958 | Quinn | Jan. 27, 1948 |
| 2,436,077 | Robertson | Feb. 17, 1948 |